United States Patent [19]

Yesnik

[11] Patent Number: 5,048,654
[45] Date of Patent: Sep. 17, 1991

[54] CERAMIC CLUTCH SEPARATOR PLATES

[75] Inventor: Marc A. Yesnik, Chicago, Ill.

[73] Assignee: Borg-Warner Automotive, Inc., Sterling Heights, Mich.

[21] Appl. No.: 556,601

[22] Filed: Jul. 20, 1990

[51] Int. Cl.⁵ ............................................. F16D 69/02
[52] U.S. Cl. .............................. 192/70.14; 188/251 A; 192/107 M
[58] Field of Search ................ 192/107 M, 70.14; 188/251 A

[56] References Cited

U.S. PATENT DOCUMENTS

| | | | |
|---|---|---|---|
| 2,470,269 | 5/1949 | Schaefer | 192/107 |
| 2,908,368 | 10/1959 | Granke et al. | 192/107 |
| 3,014,884 | 12/1961 | Bray | 523/307 |
| 3,179,209 | 4/1965 | Lucien et al. | 188/72 |
| 3,221,853 | 12/1965 | Batchelor et al. | 192/66 |
| 3,269,489 | 8/1966 | Roth | 188/71 |
| 3,371,756 | 3/1968 | Spitz | 188/251 |
| 3,434,998 | 3/1969 | Aldrich et al. | 260/38 |
| 3,703,224 | 11/1972 | Bray | 188/251 M |
| 3,730,316 | 5/1973 | Zimmer | 192/41 A |
| 3,731,776 | 5/1973 | Fisher | 192/107 M |
| 3,735,474 | 5/1973 | Bark et al. | 29/451 |
| 3,744,604 | 7/1973 | Austen | 192/53 C |
| 3,856,120 | 12/1974 | Kwolek et al. | 188/251 A |
| 3,899,050 | 8/1975 | Savary et al. | 188/73.1 |
| 3,927,241 | 12/1975 | Augustin | 192/107 M X |
| 4,024,933 | 5/1977 | Hinderks | 188/77 R |
| 4,180,622 | 12/1979 | Burkhard et al. | 192/107 M X |
| 4,182,437 | 1/1980 | Roberts et al. | 188/251 A |
| 4,189,424 | 2/1980 | Takamatsu | 260/42.15 |
| 4,290,510 | 9/1981 | Warren | 192/107 M X |
| 4,358,001 | 11/1982 | Iverson | 192/113 B X |
| 4,533,032 | 8/1985 | Lamarche | 192/107 M |
| 4,615,427 | 10/1986 | Majima | 192/107 M |
| 4,618,049 | 10/1986 | Pflaum et al. | 192/107 M |
| 4,741,424 | 5/1988 | Kitano et al. | 192/107 M |
| 4,949,818 | 8/1990 | Siede | 192/107 M X |

Primary Examiner—Rodney H. Bonck
Attorney, Agent, or Firm—James A. Geppert; Greg Dziegielewski

[57] ABSTRACT

An improvement in a torsional coupling in which clutch separator plates (24) are interleaved between clutch friction plates (16) having friction linings (18) on the opposite surfaces thereof to provide an increased coefficient of friction without substantially increasing the wear of the friction lining of the clutch plates during operation of the clutch or brake. The separator plates (24) are formed of a solid ceramic material (24a) or of a steel plate (46) which is coated with a thin layer of the ceramic material (48). Suitable ceramics include silicon nitride, aluminum oxide and zirconium oxide.

16 Claims, 4 Drawing Sheets

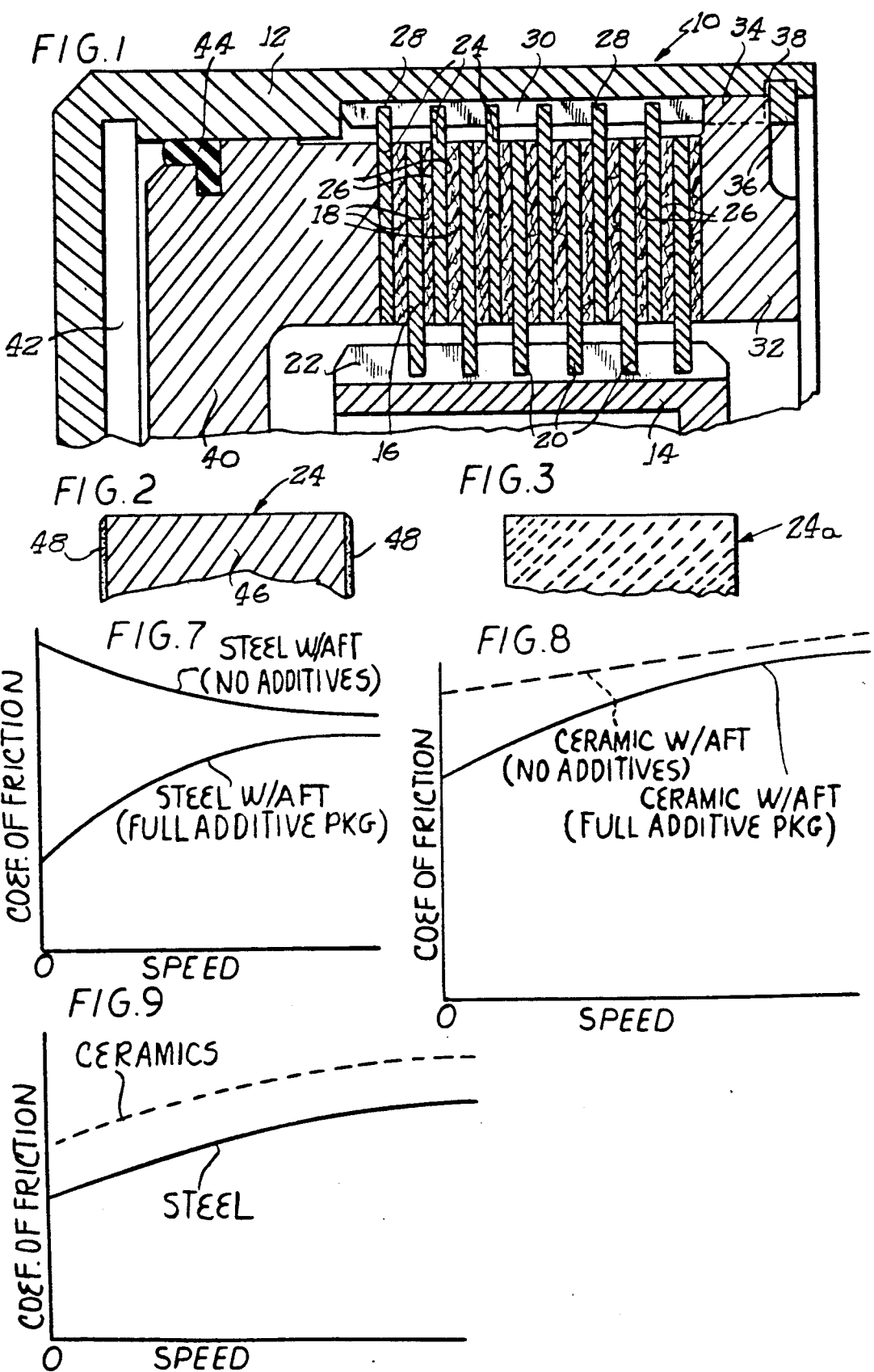

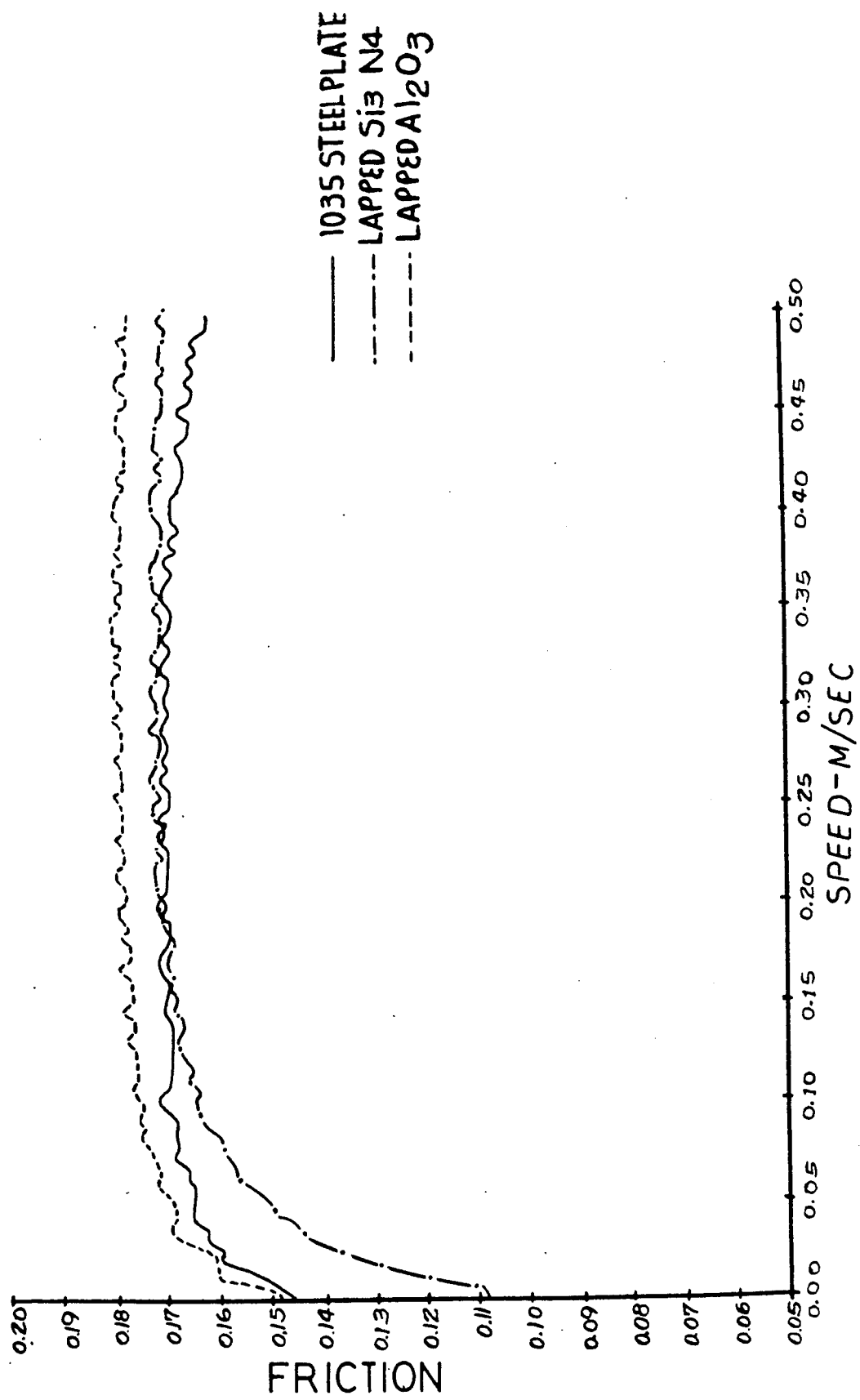

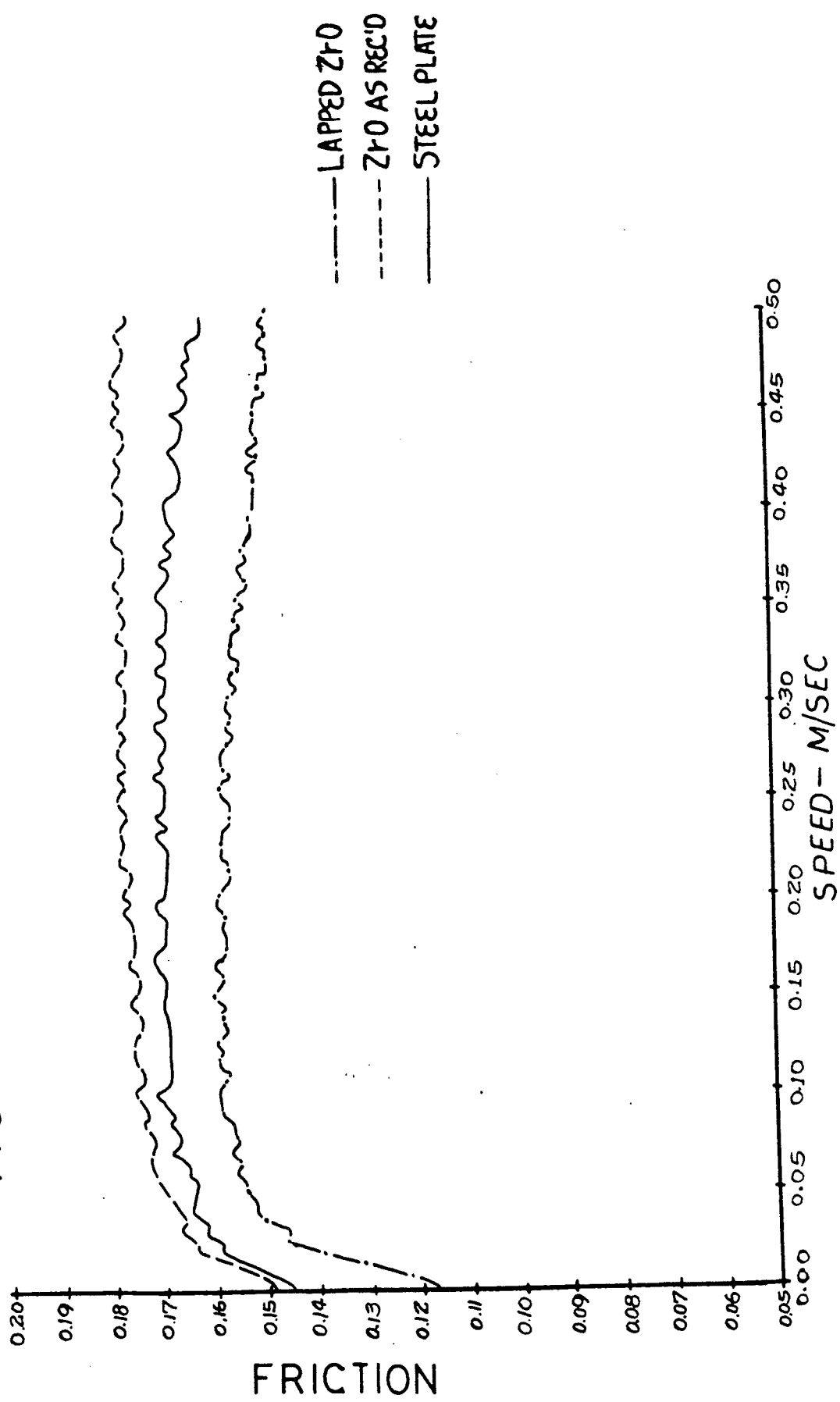

CERAMIC CLUTCH SEPARATOR PLATES

TECHNICAL FIELD

The invention disclosed herein relates to improvements in clutch separator plates, such as utilized in clutch or brake disc packs for vehicle automatic transmissions and the like, wherein the separator plates are formed of a steel core coated with a ceramic material or are a solid ceramic material to enhance the frictional characteristics of the clutch.

BACKGROUND

Conventional multiple disc clutches and brakes employed in a drive train to transmit torque in an automatic transmission for an automotive vehicle or the like generally include a clutch disc pack consisting of a plurality of engagable clutch plates alternating with clutch separator plates interleaved therewith; the clutch plate surfaces having suitable friction linings, such as a resin-based, paper friction material, and the separator plates having generally smooth surfaces on the opposite faces thereof to engage the friction linings on the faces of the clutch plates. One set of plates has interior splines to engage a rotatable member and the other set of plates has exterior peripheral splines to engage either a second rotatable member or a stationary member to form the torsional coupling. Thus, one set of plates are splined to an encompassing clutch or brake drum while the other alternating set of plates are splined onto a central shaft or ring.

Prior efforts to improve the frictional characteristics of a clutch resided in the improvement of the friction lining for the clutch plates or discs, and substantially no attention has been paid to the frictional characteristics of the separator plates. One problem of the separator plates is in wear of the separator plate surfaces due to the frictional characteristics of the clutch plates. Less wear of the separator plates would provide more of a "steady state" rotating member and therefore consistent performance. There also is a need for higher friction to support current higher torque applications. More recently where the friction linings for the clutch plates have been formed of a paper-based friction material, the separator plates should not be formed of a material or have a surface texture which would cause undue wear upon the friction lining.

As the clutch plates have friction linings secured to the opposite faces thereof, the separator plates are conventionally finished by a tumbling process to have relatively smooth surfaces engaging with the friction lining material. To enhance the frictional characteristics of the steel plates when used in combination with the friction lined clutch plates, it has been suggested that the surface be altered to change the characteristics of the steel plates. Various surface preparation procedures were tried, such as sand blasting, shot peening and knurling, however, the resulting surface either did not enhance the coefficient of friction or caused undue wear and/or damage to the friction lining of the mating clutch disc faces. This, in turn would shorten the useful life of the clutch plates in the clutch pack for the automatic transmission.

Also, coating of the separator plates was attempted using a wear-resistant material, such as sputter coating of the steel plates with titanium nitride or similar metallic nitrides; materials known for their wear resistant properties for tool bits, saw blades, etc. Although a slight increase in the frictional characteristics may have been detected, this improvement was clearly offset by a noticeable increase in the wear on the friction linings. The present invention overcomes the wear problems for the friction material while increasing the coefficient of friction for the cooperating clutch discs and separator plates.

DISCLOSURE OF THE INVENTION

The present invention relates to a novel clutch separator plate to be utilized in a clutch or brake pack having clutch plates alternating with clutch separator plates wherein the clutch plates are provided with friction linings on the opposite sides of each plate. Rather than forming the separator plates of steel with a wear-resistant coating applied thereto, the present improvement resides either in the formation of the entire separator plate of a ceramic material for wearability and frictional characteristics or the coating of a steel plate with a suitable ceramic material. Such a ceramic material could be silicon nitride, aluminum oxide or zirconium oxide, which materials increased friction by 5 to 10% over a standard 1035 steel plate without appreciable wear of the ceramic material.

BRIEF DESCRIPTION OF THE DRAWINGS

FIG. 1 is a partial cross sectional view through a clutch pack showing the friction and separator plates in a torsional coupling.

FIG. 2 is an enlarged partial cross sectional view of a ceramic coated separator plate.

FIG. 3 is a view similar to FIG. 2 but showing a solid ceramic separator plate.

FIG. 4 is a graph showing the frictional characteristics at a 300 degree F. testing sequence of a separator plate formed of either silicon nitride or aluminum oxide with a 6 micron lap compared with a 1035 tumbled steel plate.

FIG. 5 is a graph similar to FIG. 4 but showing the frictional characteristics of a zirconium oxide plate with an "as received" surface and a zirconium oxide ceramic plate with a 6 micron lap compared with a 1035 tumbled steel plate.

FIG. 7 is a graph showing the frictional characteristics of a steel separator plate in an automatic transmission fluid with and without additives.

FIG. 8 is graph similar to FIG. 4 but showing a ceramic coated separator plate in the automatic transmission fluid with and without additives.

FIG. 9 is a graph similar to FIGS. 7 and 8 but showing the frictional characteristics of ceramic and steel plates in an automatic transmission fluid.

MODES FOR CARRYING OUT THE INVENTION

Figure 6:
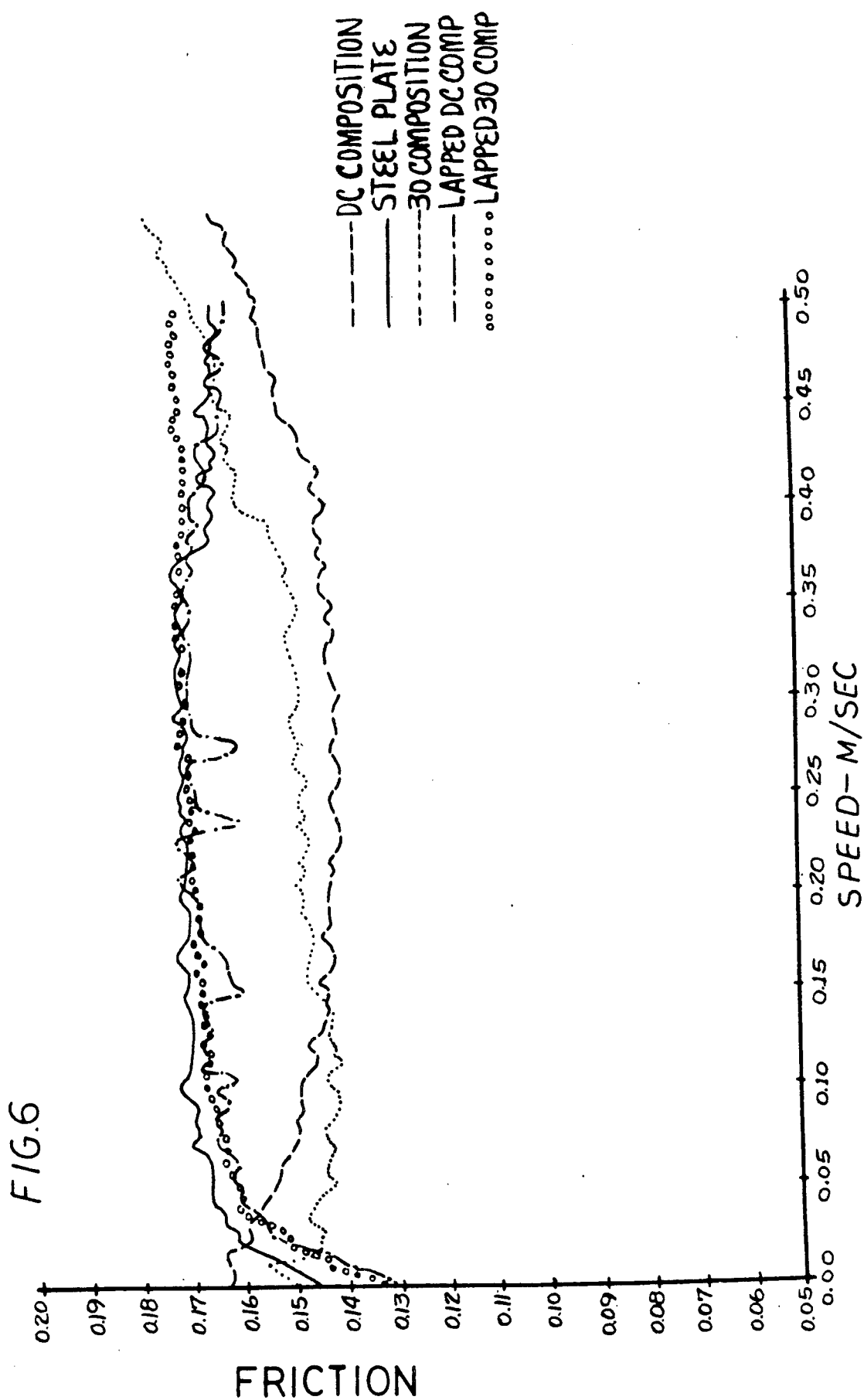
FIG. 6 is a graph similar to FIG. 4 but showing the frictional characteristics of a D.C. composition and 30 composition tumbling media as molded surfaces, a D.C. composition tumbling compound with a 6 micron lapped surface, and a 30 composition tumbling compound with a 6 micron lapped surface compared with a 1035 tumbled steel plate.

Referring more particularly to the disclosure in the drawings wherein is shown an illustrative embodiment of the invention, FIG. 1 discloses a portion of the upper half of a typical torsional coupling utilizing a clutch pack 10 in a clutch or brake for the automatic transmission in an automotive vehicle, the coupling comprising a drum or brake member 12 formed of cast iron, steel or powdered metal mounted for rotation on suitable bearings (not shown) and an internal metal hub or shaft 14 formed of one of the same materials also suitably mounted for rotation. The drum 12 is adapted to be driven by a torque apply member and the hub or shaft 14 is adapted to be drivingly connected to a load to be driven, although the driving and driven portions could be reversed.

Between the drum and hub are located a plurality of annular metal friction clutch plates 16 having suitable friction linings 18 secured to the opposite faces of each plate. Each friction plate 16 has internal teeth 20 thereon meshing with external splines or ribs 22 on the external surface of the hub 14 for rotation therewith. Alternating with the clutch plates are separator plates 24 having external teeth 28 meshing with internal splines or ribs 30 on the interior surface of the drum 12; the clutch plates and separator plates being interleaved together. Although shown as operatively connected to two rotating members, the separator plates 24 could be connected to a suitable stationary member as where the coupling is applied to a brake in a transmission rather than a clutch. An annular backing plate 32 has teeth 34 on its periphery meshing with the drum splines 30 and is retained axially through a retaining ring 36 mounted in an internal annular groove 38 in the drum.

An annular apply piston 40 is mounted to axially slide within the drum and is normally urged leftward (as seen in FIG. 1) to a disengaged position by suitable clutch release means, such as release springs (not shown). Fluid under pressure is admitted into the chamber 42 at the left-hand end of the piston 40 to urge the piston towards the clutch plates 16 to squeeze the clutch plates and separator plates 24 together so that the friction linings 18 engage the opposite surfaces 26 of the separator plates 24 between the piston and backing plate. With the plates engaged, a power path is established for torque transmittal between the drum 12 and the hub 14. An annular seal 44 is positioned in a groove in the periphery of the piston to prevent leakage from the apply chamber 42 past the piston 40. When the fluid in the chamber 42 is allowed to exhaust or exit, the return means moves the piston to its disengaged position to disengage the clutch.

FIG. 2 discloses a portion of a single separator plate utilized in the clutch pack separating a pair of adjacent clutch plates 16 having suitable linings formed of a resin-based paper friction material. The separator plate 24 is formed of a steel plate 46 coated with a layer 48 of a ceramic material, such as silicon nitride, aluminum oxide or zirconium oxide; although other ceramic materials may be suitable for the separator plate. The separator plate has a surface finish of from 1.0 micro-inch to 37 micro-inches to provide optimum surface texture, which in turn allows fluid suspension/support in the contact area. It appears that the ceramic coating preserves its initial state surface texture.

The insulating properties of the ceramic material forces more heat to the contact area of the mating plate, rather than being allowed to dissipate in the separator plate. This increase of surface temperature does not damage the lining integrity or degrade it. The use of the ceramic material increases friction by 5 to 10% over 1035 steel plate, and it appears that surface hardness and surface finish contributes more to increased friction than does the material composition. Increasing ceramic surface roughness increased the wear of the clutch material, however no ceramic wear occurred in any of the tests involving the ceramic materials. A good working range for ceramic surfaces is from an arithmetic average (Ra) of 1.0 to 40 microinches. FIG. 3 discloses a similar separator plate 24a which is formed of a solid ceramic material, such as previously set forth.

FIG. 4 discloses a graph showing the frictional characteristics of two ceramic coatings having their surfaces treated with a 6 micron lapping operation versus a standard 1035 tumbled steel plate plotted as the coefficient of friction versus speed in meters per second in a Texaco TL8570 lubricant at a temperature level of 300 degrees F. (the reservoir temperature of the lubricant), under a load of 120 psi, a mean radius of 0.5 inches and a contact area of 0.393 square inches. This graph illustrates the curves for either a solid ceramic separator plate which has had a 6 micron lapping operation or a steel separator plate that has been lapped with a 6 micron lapping operation and then coated with a silicon nitride or aluminum oxide coating against a SD1777 friction lining.

The graph shown in FIG. 5 is similar to that of FIG. 4 with the same parameters, except the comparison is between a zirconium oxide plate in an "as received" condition and a zirconium oxide plate having a 6 micron lapping operation on the surface when compared with the standard 1035 tumbled steel plate.

In FIG. 6, the graph illustrates a D.C. composition and 30 composition tumbling media as molded surfaces, the D.C. composition with a 6 micron lapped surface and a 30 composition with a 6 micron lapped surface, all compared with the standard 1035 tumbled steel plate under the same parameters as in the tests of FIG. 4. Both compositions are aluminum oxide tumbling compounds, the D. C. composition having a greater bulk density than the 30 composition. For the "as received" D. C. composition and 30 composition, the data was compiled at 100 degrees F. due to the high rate of wear of the friction lining. However, for the two compositions after lapping and the 1035 steel plate, the tests were conducted at 300 degrees F.

FIG. 7 is a graph which plots the coefficient of friction versus speed of a 1035 tumbled steel separator plate in an automatic transmission fluid (ATF) without any additives and with a full additive package. Similarly, FIG. 8 shows the same graph for a ceramic separator plate or ceramic coated plate in the same ATF with and without the full additive package. It can be seen from FIG. 7 that the steel plate in the ATF with full additive package has a relative smooth clutch engagement, while the plate in the ATF without the additive package has a very harsh engagement. FIG. 8 discloses that the ceramic separator plate or ceramic coated plate has similar curves for the ATF with and without the additive package. Thus, in an ATF, the frictional characteristics will not change very much as the additive package deteriorates or ages over time, and at no time will the clutch engagement be as rough as that shown in FIG. 7 in the non-additive package. For the purposes of comparison, deteriorated ATF is believed to be comparable to an ATF without an additive package. A deteriorated or degraded ATF would be where the additive package has become insoluble or burnt off from the transmission fluid. Under these conditions, the ceramic separator plate becomes an attractive alternative.

Finally, FIG. 9 discloses a graph illustrating the frictional characteristics of a ceramic separator plate compared with a 1035 steel separator plate. It is clearly seen that the ceramic material has a higher coefficient of friction compared to the steel plate but retains a smooth engagement characteristic in a clutch operation. This phenomena is experienced using three different lubricating fluids; namely, 1) Texaco TL8570, 2) Ford Motor Company Type F fluid, and 3) Mobil 220 fluid. It has been found that a silicon nitride ceramic resulted in the lowest static/dynamic ratio and is therefore expected to provide the smoothest clutch engagement. These results are shown in the following table.

TABLE I

| Mat'l | ATF | Static Fric. avg. | Dynamic Fric. avg. | S/D | Lining wear mils. |
|---|---|---|---|---|---|
| 1035 | Base | 0.221 | 0.125 | 1.8 | 0.8 |
| Si₃N₄ | Base | 0.146 | 0.153 | 0.95 | 0.5 |
| Si₃N₄ | Base | 0.140 | 0.152 | 0.92 | 0.4 |
| 1035 | F | 0.174 | 0.177 | 0.98 | 0.8 |
| Si₃N₄ | F | 0.179 | 0.183 | 0.98 | 0.8 |
| 1035 | 220 | 0.113 | 0.144 | 0.78 | 0.7 |
| Si₃N₄ | 220 | 0.124 | 0.155 | 0.80 | 0.7 |
| 1035 | TL8570 | 0.157 | 0.166 | 0.95 | 0.5 |
| Si₃N₄ | TL8570 | 0.154 | 0.169 | 0.91 | 0.6 |

The average frictional values were calculated from friction tests at 100 degrees F., 200 degrees F. and 300 degrees F.; the dynamic values being taken at 100 feet per minute and the static values being taken at 1.0 foot per minute using the same parameters as the previous examples. Thus, the use of a ceramic material either as a coating on a steel separator plate or as a solid ceramic plate provides a heightened coefficient of friction in automatic transmission fluid either with or without the additive package, and the ceramic separator plates having a lapped or similar surface treatment will result in an increased coefficient of friction without any substantial increase in the wear of the friction linings on the clutch plates during operation of the clutch pack in an automatic transmission.

INDUSTRIAL APPLICABILITY

The present invention is useful in the clutch disc packs utilized in clutches or brakes in automatic transmissions for automotive vehicles.

I claim:

1. In a clutch pack (10) for a vehicle automatic transmission or the like wherein clutch plates (16) having friction linings (18) are interleaved with clutch separator plates (24), the clutch plates being splined to one rotatable member (14) and the separator plates being splined to a second rotatable (12) and the separator plates being splined to a second coupling, the improvement comprising that each separator plate (24) has a surface texture which increases the coefficient of friction between the clutch plates (16) and separator plates (24) without substantially increasing the frictional wear of the friction linings, each separator plate being formed with a ceramic coating (48) on the opposite surfaces of the plate having a surface roughness of from 1.0 to 40.0 microinches (Ra).

2. A clutch separator plate as set forth in claim 1, wherein each separator plate (24) has the opposite surfaces (26) treated to provide a smooth surface.

3. A clutch separator plate as set forth in claim 2, wherein each separator plate (24) is lapped with a lapping compound to provide a proper smooth surface texture.

4. A clutch separator plate as set forth in claim 3, in which each separator plate (24) is lapped with a 6 micron lapping compound.

5. A clutch separator plate as set forth in claim 1, in which the ceramic material (48) is a silicon nitride, aluminum oxide or zirconium oxide.

6. A clutch separator plate as set forth in claim 1, in which each separator plate (24) is formed from a steel core (46) and a ceramic material (48) is coated on the opposite surfaces (26) of the steel by a sputter-coating process.

7. A clutch separator plate as set forth in claim 6, in which the steel core (26) is subjected to a lapping operation prior to coating with the ceramic material (48).

8. In a clutch pack (10) for a vehicle automatic transmission or the like wherein clutch plates (16) having friction linings (18) are interleaved with clutch separator plates (24a), the clutch plates being splined to one rotatable member (14) and the separator plates being splined to a second rotatable (12) or stationary member to form a torsional coupling, the improvement comprising that each separator plate (24a) has a surface texture which increases the coefficient of friction between the clutch plates (16) and separator plates (24a) without substantially increasing the frictional wear of said linings, each separator plate (24a) being formed of a solid ceramic material.

9. A clutch separator plate as set forth in cliam 8, in which the solid ceramic material is lapped to provide the surface texture.

10. A clutch separator plate as set forth in claim 8, in which the surface texture of said ceramic material has a roughness in the range of 1.0 to 40 microinches (Ra).

11. In combination with clutch friction plates (16) having a resin-based paper friction material (18) applied as a lining thereto, clutch separator plates (24) having a surface texture thereon which increases the coefficient of friction of the lining without increasing the wear thereof, each said separator plate (24) having said surface texture resulting from the use of a ceramic material (48) for the separator plates with a roughness in the range of 1.0 to 40 microinches (Ra).

12. The combination of claim 11, in which each separator plate (24) has a steel core (46) coated with a ceramic material (48) on the opposite surfaces (26) thereof.

13. The combination of claim 12, in which the surface (26) of each separator plate (24) is treated by lapping with a 6 micron lapping compound prior to the ceramic coating (48) being applied to the steel core.

14. In combination with clutch friction plates (16) having a resin-based paper friction material (18) applied as a lining thereto, clutch separator plates (24a) having a surface texture thereon which increases the coefficient of friction of the lining without increasing the wear thereof, each said separator plate (24a) having said surface texture resulting from the use of a ceramic material (48) for the separator plates, each clutch separator plate (24a) being formed as a solid ceramic material.

15. The combination of claim 14, in which the solid ceramic plate (24a) is lapped with a 6 micron lapping compound.

16. A clutch separator plate as set forth in claim 14, in which the surface texture of said ceramic material has a roughness in the range of 1.0 to 40 microinches (Ra).

* * * * *